(12) United States Patent
Elior et al.

(10) Patent No.: US 6,961,146 B1
(45) Date of Patent: Nov. 1, 2005

(54) METHOD FOR HOMOGENIZING THE EXPOSURE OF THE DIFFERENT BEAMS IN A MULTI BEAM PLOTTER

(75) Inventors: Ariel Elior, Modi'in (IL); Alex Weiss, Kadima (IL); Shmuel Vashdi, Kfar-Saba (IL)

(73) Assignee: Creo Il LTD, Herzlia (IL)

( * ) Notice: Subject to any disclaimer, the term of this patent is extended or adjusted under 35 U.S.C. 154(b) by 837 days.

(21) Appl. No.: 09/717,390

(22) Filed: Nov. 22, 2000

Related U.S. Application Data

(60) Provisional application No. 60/167,916, filed on Nov. 30, 1999.

(51) Int. Cl.[7] .............................................. G06F 15/00
(52) U.S. Cl. ......................................... 358/1.3; 358/1.8
(58) Field of Search .................... 358/1.1, 1.3, 1.8, 358/3.24, 3.26, 3.27, 1.12, 1.14, 504, 521, 532, 1.4, 1.5, 1.7, 1.18; 382/254, 255, 258

(56) References Cited

U.S. PATENT DOCUMENTS

| 5,615,198 | A | | 3/1997 | Kubokawa |
| 5,812,892 | A | | 9/1998 | Kimba et al. |
| 6,046,819 | A | * | 4/2000 | Yoshida ...................... 358/1.8 |
| 6,473,233 | B1 | * | 10/2002 | Iizuka ........................ 359/566 |

FOREIGN PATENT DOCUMENTS

| EP | 0632434 A1 | * | 1/1995 |
| EP | 0879705 | | 11/1998 |
| EP | 0895185 | | 2/1999 |
| WO | WO9838597 | * | 3/1998 |

* cited by examiner

*Primary Examiner*—Gabriel Garcia
(74) *Attorney, Agent, or Firm*—Pearl Cohen Zedek Latzer, LLP

(57) ABSTRACT

Disclosed are methods and apparatus for homogenizing the exposure of different beams in a multi beam-plotter. The plotter typically operates on films or plates.

9 Claims, 2 Drawing Sheets

Figure 1:
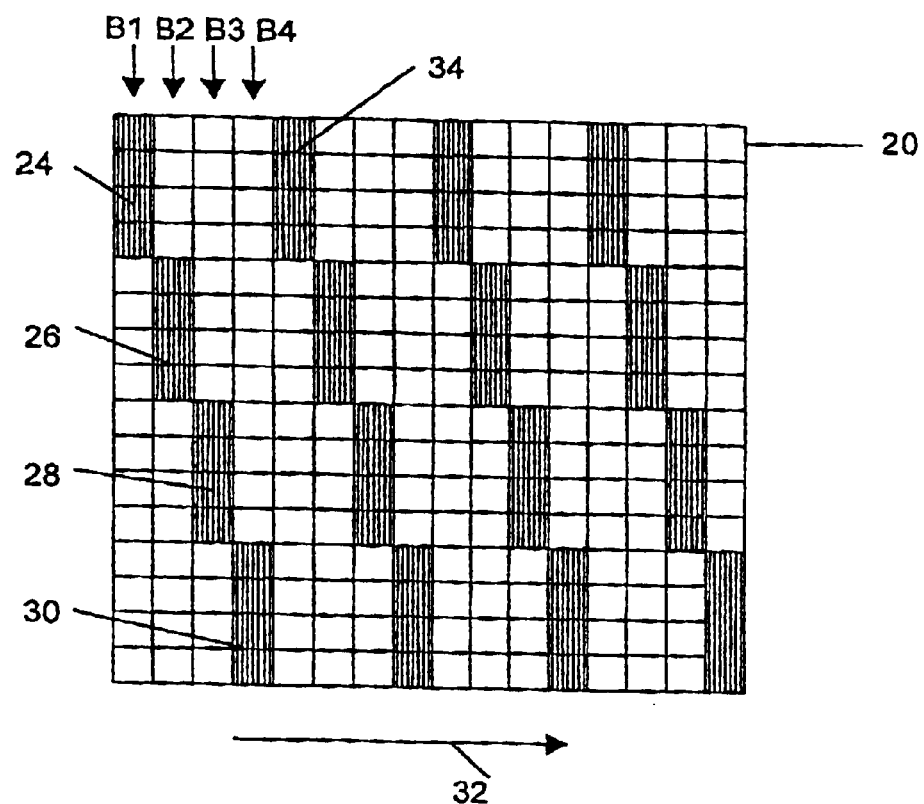

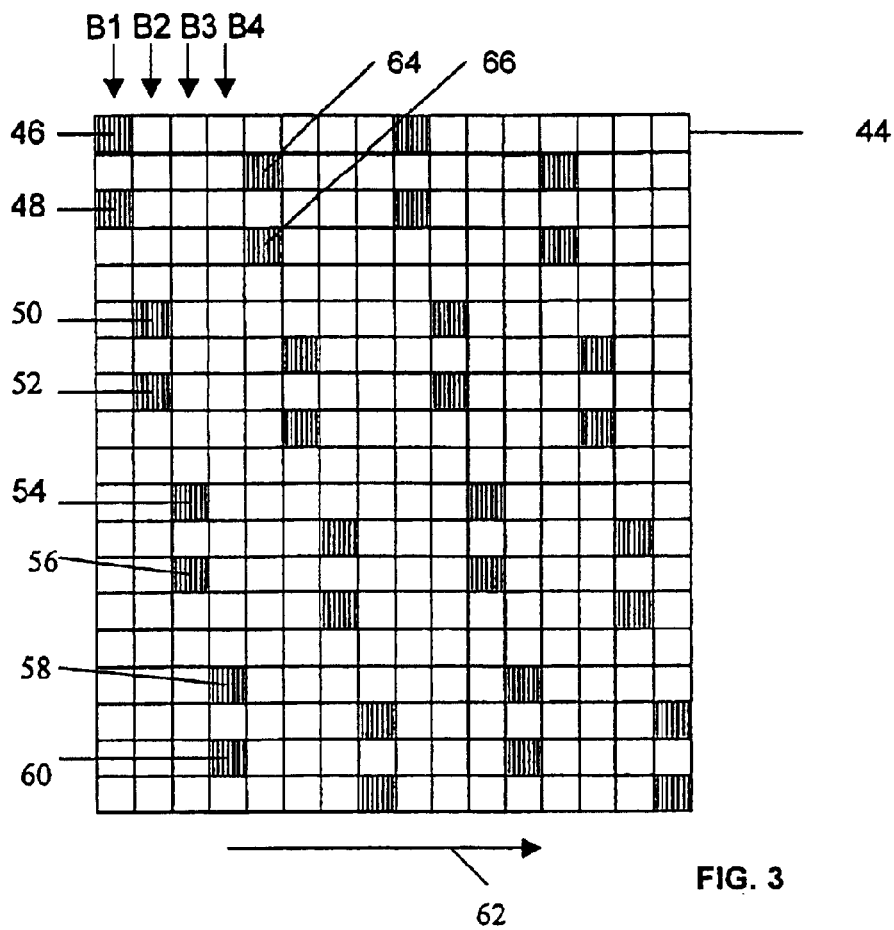
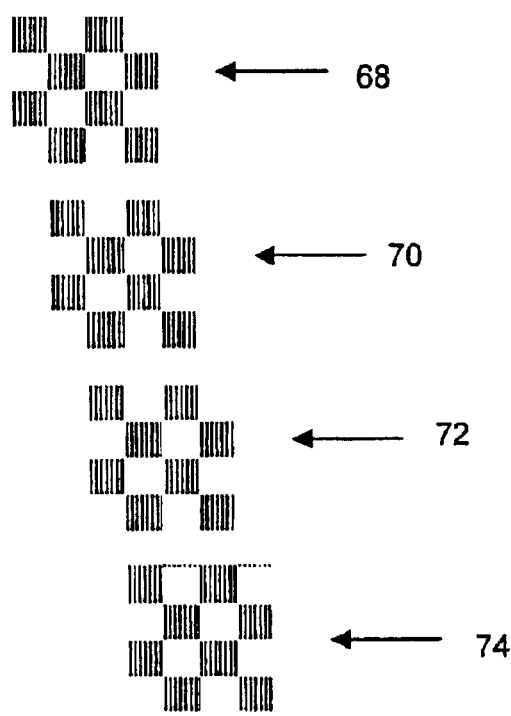
FIG. 3
FIG. 4

METHOD FOR HOMOGENIZING THE EXPOSURE OF THE DIFFERENT BEAMS IN A MULTI BEAM PLOTTER

The present application claims benefit from U.S. Provisional Application No. 60/167,916 entitled "A Method for Homogenizing the Exposure of the Different Beams in a Multi Beam Plotter" and filed on Nov. 30, 1999, which is incorporated herein by reference in its entirety.

FIELD OF THE INVENTION

The present invention relates to the field of plotting on film or plate and more specifically to plotting by a multi-beam laser array.

BACKGROUND OF THE INVENTION

A multi-beam plotter is a device that uses an array of laser beams to produce an image on a light sensitive media like film or offset plate. In most such machines, the beams in the array are adjacent to one another. In order to receive a good image without artifacts, the intensity of the different laser beams on the exposed media should have a very similar value. Plotters usually have a light calibration system that uses a light detector to calibrate all the laser beams to work at the same intensity. In spite of the light calibration system, the exposed image looks, sometimes, not quite homogeneous. This non-homogeneous exposure can be caused, for example, by a slight difference in the wavelength of the different beams and a non-flat response of the media to the different wavelengths.

In order to solve the non-homogeneity problem, each beam has to be operated separately, its exposure result investigated and the intensity of each diode corrected accordingly. In a multi-beam plotter, exposing with a single beam takes, relatively, a very long time. Hence, This calibration procedure is very tedious and cumbersome.

SUMMARY OF THE INVENTION

It is an object of the present invention to provide a method for homogenizing the exposure of different beams in a multi-beam plotter, comprising the steps of:

creating digital data, wherein each row comprises data to be exposed by one of said beams; and using said plotter to expose said digital data on a substrate, wherein, following each exposure cycle by all of said beams moving in a first direction relative to said substrate, said beams move in a second direction, generally perpendicular to said first direction, relative to said substrate, and wherein the distance traversed by said beams in said second direction is smaller than the sum of widths covered by all of said beams.

It is a further object of the present invention to provide a method for homogenizing the exposure of different beams in a multi-beam plotter, comprising the steps of creating creating digital data, wherein each row comprises data to be exposed by one of said beams and wherein each column comprises a number of consecutive data elements, said number being equal to the number of said beams.

using said plotter to expose said digital data on a substrate, wherein, following each exposure cycle by all of said beams moving in a first direction relative to said substrate, said beams move in a second direction, generally perpendicular to said first direction, relative to said substrate, and wherein the distance traversed by said beams in said second direction is smaller than the sum of widths covered by all of said beams.

It is yet another object of the present invention to provide a method for homogenizing the exposure of different beams in a multi-beam plotter, comprising the steps of:

creating digital data, wherein each row comprises data to be exposed by one of said beams; and using said plotter to expose said digital data on a substrate, wherein, following each exposure cycle by all of said beams moving in a first direction relative to said substrate, said beams move in a second direction, generally perpendicular to said first direction, relative to said substrate, and wherein the distance traversed by said beams in said second direction is equal to the width of one column covered by each one of said beams.

DETAILED DESCRIPTION OF THE INVENTION

The present invention provides a method to expose, in one pass of the machine, an image that is composed of a series of calibration patches, each one exposed by a different beam. The method combines exposing an especially designed file and a special mode of the carriage motion, carrying the exposure head.

It is an aim of the present invention to provide an exposed pattern that will facilitate the separate investigation of the light intensity of each laser beam, by exposing solid blocks, each exposed by one predetermined beam.

The digital file built for this purpose comprises, in each row, data to be exposed by a single beam. Each row is constructed of one-pixel width columns, comprising data-columns (ON) and non-data-columns (OFF). The distance between two adjacent data-columns in each row equals the number of working beams. The rows are similar to each other, but with a data-column shift of one pixel (in the direction of the carriage movement) between rows assigned to adjacent beams.

Normally, when exposing a pattern using a multi-beam array of N beams, N adjacent columns will be exposed on each revolution of the drum, followed by a carriage movement in the carriage movement direction, perpendicular to the exposure direction. The distance of the carriage movement equals the width of the array, resulting in a gap of the same width between consecutive columns exposed by each beam.

According to the present invention, while exposing the special file the carriage moves, after each revolution of the drum, a distance that is equal to the distance it would cover if the exposure had been done with less than the total number of beams, while the data distribution between the different beams does not change. In the extreme case, the carriage covers a distance corresponding to only one working beam. This reduced motion distance results in the shrinking of the exposed data in the direction of the carriage movement during exposure; i.e. the columns appear on the media closer than in the original file. If the distance is of one working beam, the columns exposed by each beam appear adjacent to one another, without the gaps that exist in the original file. Because of the one-pixel shifts in the design of the original file, a different beam exposes each row. The final result on the media is a slanted column of patches, each exposed by a different beam. This pattern gives the operator a tool for investigating the interaction between the media and each single beam, and for correcting the beam intensity accordingly.

Figure 2:
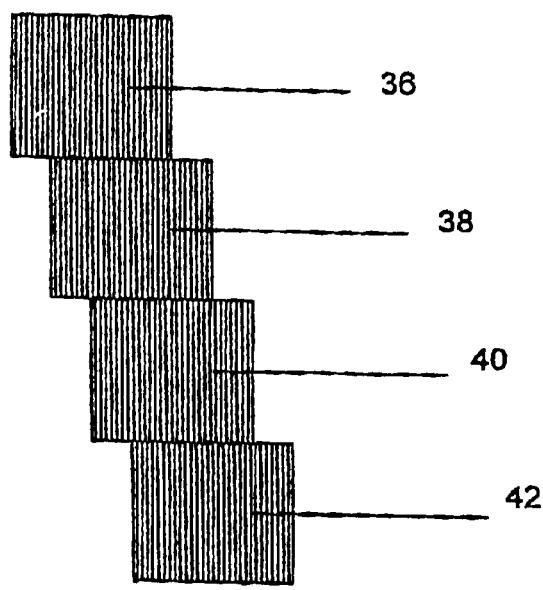

Compared to the conventional method of exposing, creating these one-beam patches in the method of the present invention reduces the exposure time for creating the N patches by a factor equal to the number of working Attention is drawn now to FIG. 1, showing a first example of a digital pattern to be exposed according to the present invention and to FIG. 2, showing the resulting exposed pattern of patches. In this example, the number of working beams is 4 and the carriage motion distance equals that of a one-beam system.

The digital pattern 20 comprises data patches. During the first revolution of the drum, patch 24 is exposed by beam B1, patch 26 is exposed by beam B2, patch 28 is exposed by beam B3 and patch 30 is exposed by beam B4. Following this revolution, the carriage moves in the direction indicated by arrow 32, a distance that equals one column width. On the other hand, the data system supplies each laser diode with the same data it would have been supplied in a normal working carriage motion, resulting in patch 34 being exposed by beam B1, etc.

FIG. 2 shows the resulting exposed pattern, where patch 36 was exposed by beam B1, patch 38 was exposed by beam B2, patch 40 was exposed by beam B3 and patch 42 was exposed by beam B4.

Attention is drawn now to FIG. 3, showing a second example of a digital pattern to be exposed according to the present invention and to FIG. 4, showing the resulting exposed pattern of patches. Again, the number of working beams is 4 and the carriage motion distance equals that of a one-beam system.

The digital pattern 44 comprises data patches. During the first revolution of the drum, patches 46 and 48 are exposed by beam B1, patches 50 and 52 are exposed by beam B2, patches 54 and 56 are exposed by beam 83 and patches 58 and 60 are exposed by beam B4. Following this revolution, the carriage moves in the direction indicated by arrow 62, a distance that equals one column width. On the other hand, the data system supplies each laser diode with the same data it would have been supplied in a normal working carriage motion, resulting in patches 64 and 66 being exposed by beam B1, etc.

FIG. 4 shows the resulting exposed pattern, where pattern 68 was exposed by beam B1, pattern 70 was exposed by beam B2, pattern 72 was exposed by beam B3 aid pattern 74 was exposed by beam B4.

It will be understood by any person skilled in the art, that the present invention, described hereinabove in conjunction with a drum plotter, can also be applied to flat-bed plotters It will also be understood that the platters that may benefit from the present invention may be film plotters (imagesetters) or platesetters, using multi-beam exposure systems.

It will further be understood that the present invention may also be applied to plateless printing systems, wherein the plate imaging is performed on the system.

What is claimed is:

1. A method for homogenizing the exposure of different beams in a multi-beam plotter, comprising the steps of:

creating digital data of a calibration pattern, said digital data comprise columns in an exposure direction and rows in a second direction, generally perpendicular to said exposure direction, wherein each of said rows comprises data to be exposed by one of said beams; and using said plotter to expose said digital data on a substrate to create said calibration pattern, wherein, following each exposure cycle by said beams moving in the exposure direction relative to said substrate, said beams move in the second direction, a distance smaller than the sum of the widths covered by said beams.

2. A method according to claim 1, wherein said step of creating comprises creating digital data wherein each column comprises a number of consecutive data elements, said number being equal to the number of said beams.

3. A method according to claim 1, wherein said distance traversed by said beams in said second direction is equal to the width of one column covered by each one of said beams.

4. The method according to claim 1, wherein said plotter is an imagesetter.

5. The method of claim 1, wherein said plotter is a platesetter.

6. The method of claim 1, wherein said plotter is a drum plotter.

7. The method of claim 1, wherein said plotter is a flatbed plotter.

8. The method of claim 1 further comprising:

determining the calibration of the light intensity of said beams based on said calibration pattern.

9. The method of claim 1, wherein each of said rows is constructed of one-pixel width columns comprising data-columns and non-data-columns and the distance between two adjacent data-columns in each of said rows equals the number of said beams.

* * * * *